Oct. 28, 1941.　　　　B. BURNS　　　　2,260,796
AUTOMATIC CLUTCH FOR MOTOR VEHICLES
Original Filed Jan. 30, 1939　　3 Sheets-Sheet 2

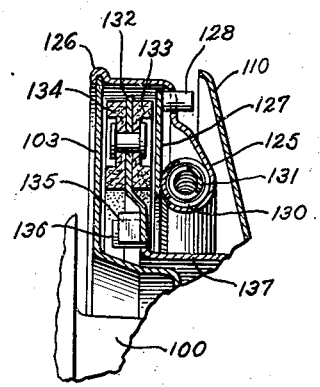

Inventor
BRUCE BURNS
By Harris, Kiech, Foster & Harris
Attorneys

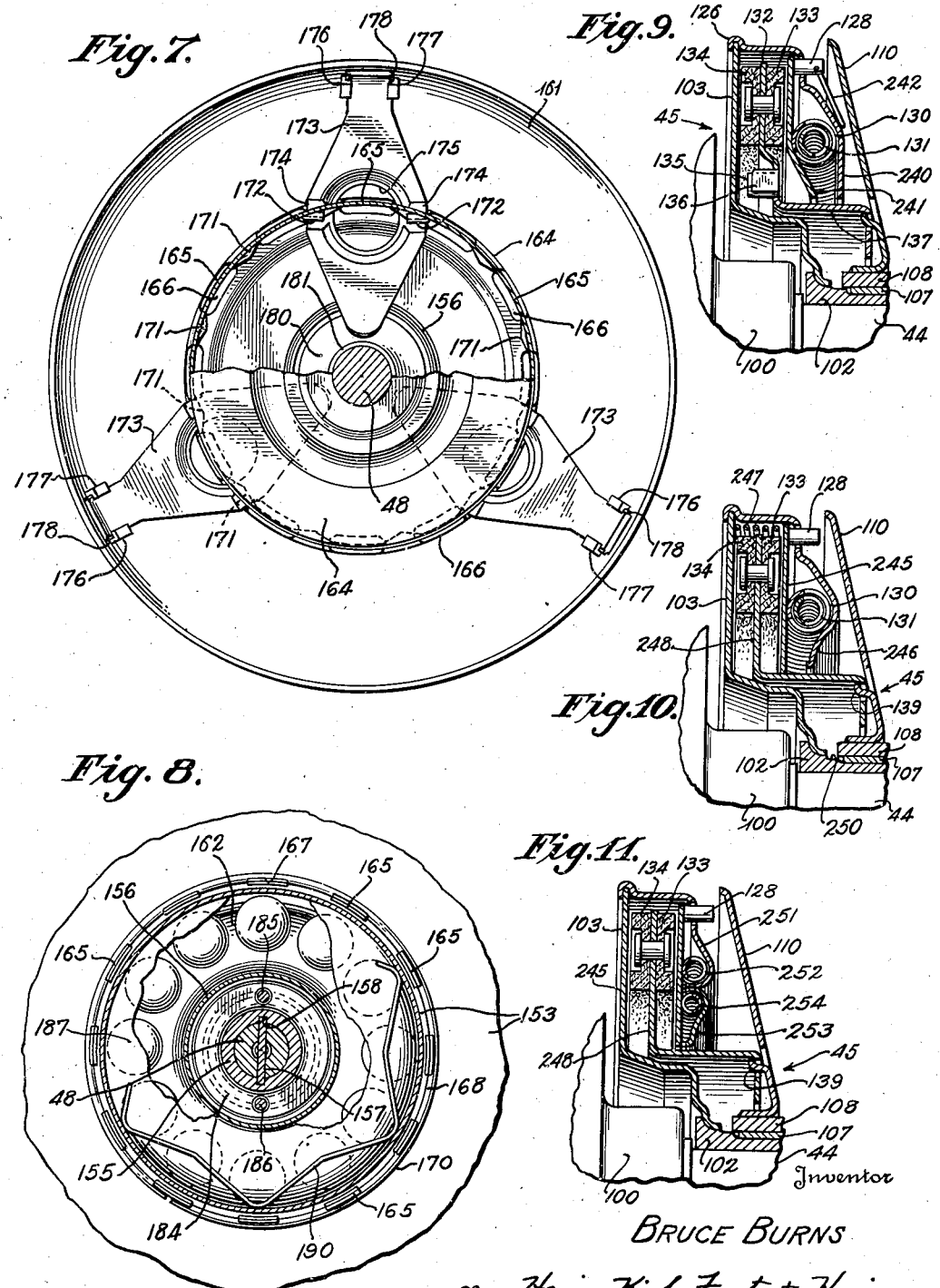

Patented Oct. 28, 1941

2,260,796

UNITED STATES PATENT OFFICE 2,260,796

AUTOMATIC CLUTCH FOR MOTOR VEHICLES

Bruce Burns, Santa Monica, Calif., assignor to Salsbury Corporation, Inglewood, Calif., a corporation of California Original application January 30, 1939, Serial No. 253,557. Divided and this application September 29, 1939, Serial No. 297,064

6 Claims. (Cl. 192—105)

This invention relates to clutches and more particularly to an automatic clutch adapted to be used in light weight motor vehicles and to serve as power transmitting means between the engine and a driven road-engaging wheel of the vehicle.

It is an object of my invention to provide an automatic clutch through which the driven wheel or wheels of a vehicle may be automatically connected and disconnected with the engine at a certain critical speed of the engine without attention from the driver of the vehicle.

Another object of the invention is to provide, in a motor vehicle, automatic clutch means which permits free idling of the engine within its normal idling range, but in which the clutch is automatically engaged to cause forward movement of the vehicle when the speed of the engine exceeds a predetermined value.

Still another object is to provide an automatic clutch construction which is cheap to construct in large quantities, which is efficient and convenient to operate, which requires a minimum of attention, and which is of long life.

These and other apparent objects I attain in a manner which will be clear from a consideration of the following description taken in connection with the accompanying drawings, in which:

Fig. 1 is a view partly in cross-section of a preferred form of the automatic clutch apparatus in driving position and an associated driven pulley forming a part of a vehicle driving mechanism;

Fig. 2 is a partial cross-sectional view with the clutch mechanism of Fig. 1 shown in idling position;

Fig. 7 is a sectional view of the driven element of the transmission shown in Fig. 1 taken along the line 7—7 in the direction indicated by the arrows;

Fig. 8 is a sectional view taken on the line 8—8 of Fig. 1 in the direction indicated by the arrows;

Figure 3:
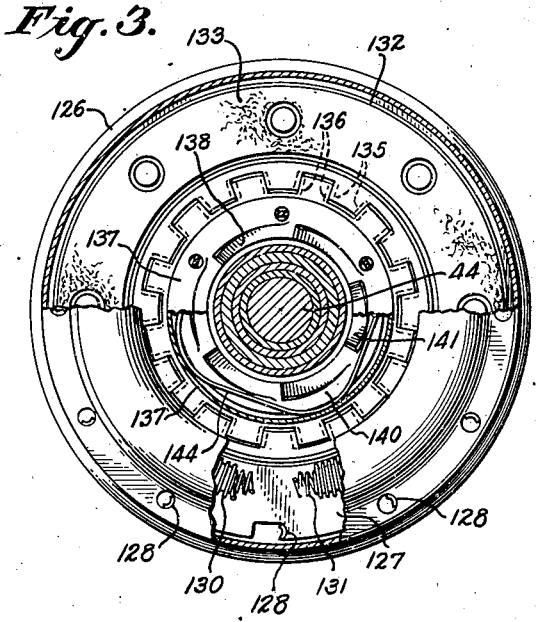
Fig. 3 is a sectional view of the clutch mechanism taken along the line 3—3 of Fig. 1, looking in the direction indicated by the arrows.

Figs. 9, 10 and 11, respectively, are cross-sectional views of portions of alternative forms of clutches.

The clutch means constituting the present invention is particularly useful for driving light weight vehicles adapted for messenger and/or light delivery service. The vehicle (not shown) is propelled by an engine, generally indicated by the numeral 41, having a crankshaft 44. Associated with the crankshaft 44 of the engine 41 is an automatic clutch unit 45 which is in driving relation with a countershaft unit 46 through a V-belt 47. The countershaft unit 46 is mounted on a countershaft 48 rotatably supported in bearings 50, in turn supported by the wheel housing 40. The countershaft 48 extends in a transverse horizontal direction through the wheel housing 40 and carries a sprocket 51 on the end thereof opposite to that with which the countershaft unit 46 is associated. The sprocket 51 is adapted to impart a drive to one of the road wheels (not shown) of the vehicle.

The crankshaft 44 of the engine 41 projects from a bearing boss 100 on the side of the crankcase 101 of the engine 41, and carries a hub 102 and a housing 103 which are preferably welded together. A pair of diametrically opposed flat faces 104 milled on the extended end of the crankshaft 44 engages mating flat surfaces in the end of the hub 102 in such manner that the crankshaft 44 and the hub 102 are rotatively keyed together. A nut 105 engages threads on the extended end of the crankshaft 44 and, acting through a washer 106, holds the hub 102 firmly in place on the crankshaft 44. Freely journaled on the cylindrical outer surface of the hub 102, with suitable end clearance, is a bushing 107 which is pressed into and carries a tubular pulley hub 108. An inclined pulley face 110 is welded to the exterior of the pulley hub 108.

Another inclined pulley face 111 opposed to the pulley face 110 is adapted to slide and rotate on the pulley hub 108 and for this purpose the pulley face 111 is welded on a sleeve 112 within which are pressed a pair of spaced, hardened steel bushings 113 which slide on the hardened and ground exterior surface of the pulley hub 108. Three posts 114 are riveted to the pulley face 111 at circumferentially spaced locations, and through a hole in each of these posts a spring 115 passes and is anchored so as to permit it to oscillate in a plane parallel to the axis of the unit 45, but to be retained against the action of centrifugal force. The springs 115 preferably consist of loops of wire pivotally connected at one end to the posts 114 and at the other end connected in a similar manner to posts 116 which are riveted to a dish-shaped housing 117. The housing 117 is formed with a series of circumferentially spaced keys 118 which engage corresponding slots 120 in the end of the pulley hub 108 and are held in place by a snap ring 121 engaging a groove on the pulley hub 108. Compression type helical coil springs 122 and 123 surround the pulley hub 108 and are compressed between the housing 117 and the pulley face 111, thus urging the pulley face 111 toward the pulley face 110 at all times. It is apparent that the pulley face 111 is axially movable relative to the pulley face 110 and the housing 117, but is constrained to rotate therewith by reason of the torque link springs 115.

Referring now to that portion of the unit 45 which functions as an automatic clutch, it will be seen that an annular ramp 125 is spun in place at 126 to form an integral unit with the housing 103 and the hub 102. Shrouded within the ramp member 125 is a floating plate 127 which is free to move axially relative to the ramp but is rotatively keyed thereto by fingers 128 which pass through holes in the ramp 125. Disposed annularly between the floating plate 127 and the ramp 125 is a circumferentially resilient centrifugal element, preferably having the form of a grommet spring 130, and preferably consisting of a closely wound spring with its ends hooked together to form a ring and within which is a similar spring 131 of smaller pitch diameter with its ends left free. The grommet spring 130 is preferably so wound and proportioned that when in place within the ramp 125, it retracts itself into firm contact with the curved innermost portion of the ramp. The ramp 125 is so shaped that it approaches the plate 127 as it proceeds outwardly from the axis of rotation, so that enlargement of the grommet spring 130 to a larger radius results in movement of the grommet spring toward the floating plate 127. Located between the floating plate 127 and the housing 103 is a clutch element preferably comprising an annular metal plate 132 having friction faces 133 and 134 riveted to opposite sides thereof. The innermost portion of the plate 132 is sheared and formed to produce a series of spaced teeth 135 which mesh with a mating series of similarly formed teeth 136 on a member 137 which is permanently attached to the concave side of the pulley face 110 by lugs 139 passing through holes in the member 137. As seen best in Fig. 4, the teeth 135 are formed by shearing the innermost edge of the plate 132 radially and bending the adjacent portions away from the line of shear into planes perpendicular to the plane of the plate 132. In this manner a pair of teeth is formed leaving a space between, and this operation is repeated around the edge of the plate to form a series of such pairs of teeth. A similar operation is used to form the pairs of teeth 136 on the outermost edge of the member 137. The teeth on the two mating members are so spaced that a pair of teeth 136 fits with suitable clearance in the space left by bending out a pair of the teeth 135, all of the teeth being directed in the same direction. It will be evident that this toothed connection compels the plate 132 and the member 137 to rotate together while permitting the plate 132 to move axially with respect to the member 137.

Figure 4:
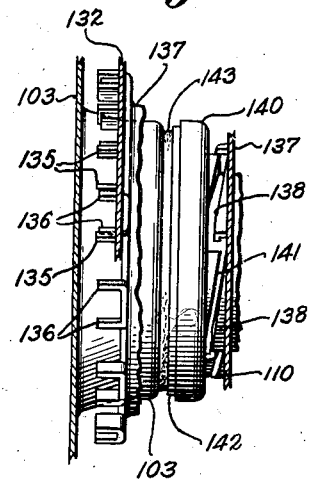
Fig. 4 is a horizontal sectional view of the clutch mechanism taken on the line 4—4 of Fig. 1, looking in the direction indicated by the arrows.

The member 137 is formed along its innermost edge with inclined teeth 138 which are preferably punched out therefrom, as shown in Fig. 4. The inclined teeth 138 preferably have about a 6° lead angle and have engaging surfaces that extend toward the housing 103 as one progresses in a direction opposite to the direction of rotation of the engine crankshaft 44. A cup-shaped member 140 is shrouded within the member 137 and has formed along its innermost edge a series of inclined teeth 141 opposed to and adapted to mate with the inclined teeth 138. Within the member 140 is pressed a cup 142 which carries an annular ring 143 of friction material. A waveform or marcel spring 144 of small wire is so preformed and positioned to bear on the member 140 and the member 137 to force the friction material 143 into contact with the housing 103. It will be noted that the pressure of the spring 144 also tends to hold the pulley face 110 in the extreme rightward position, as shown in Fig. 1.

In the operation of the unit 45, that part of the apparatus lying between the housing 103 and the member 137 serves primarily to permit starting of the engine 41 by simply moving the vehicle forward. In lightweight two-wheel and three-wheel vehicles of the type to which transmissions of the character of that herein disclosed are most readily applicable, it is often inconvenient and expensive to provide conventional electric starting mechanisms, and it is usually inconvenient, if not undesirably expensive, to provide kick starters or hand cranks. The apparatus of my invention thus overcomes the inherent disadvantages of the above mentioned types of starting through provision of the overrunning clutch starting mechanism described above.

As illustrated in the drawings, the engine 41 is considered to rotate in a clockwise direction as viewed from the right side in Fig. 1. It is apparent that forward motion of the vehicle with the engine stationary, therefore, results in similar clockwise rotation of the pulley face 110 under the influence of the V-belt 47. The inclined teeth 138 are, therefore, moved in a clockwise direction. Since the friction material 143 is held against the housing 103 by action of the marcel spring 144, the member 140 and the inclined teeth 141 lag behind the inclined teeth 138 and are thus brought into engagement therewith. Continued forward motion of the vehicle and resultant clockwise rotation of inclined teeth 138 acts by reason of their inclination to the plane of rotation, to urge the member 140 and the friction material 143 into closer and closer contact with the housing 103 until a sufficiently great frictional force between material 143 and housing 103 is produced to cause rotation of the housing 103, hub 102 and crankshaft 44 of the engine 41. Continued rotation of the engine crankshaft causes the engine to start.

After the engine has started, if the pulley face 110 be moving slowly, as is usually the case, the engine even at idling speed will rotate faster than does the pulley assembly, with the result that the inclined surfaces of the teeth 141 will be rotated out of engagement with the inclined surfaces of teeth 138 and the radial ends of teeth 141 will engage the ends of teeth 138. This leaves the force of the marcel spring 144 as the only force tending to maintain the frictional connection between the material 143 and housing 103. This force is small compared to that required to transmit the torque necessary to move the vehicle, so, with the vehicle stationary, the engine is permitted to idle freely, restrained only by the very slight braking effect caused by contact of the friction face 143 with the housing 103 under the small axial force of the marcel spring 144.

Not only does the above described starting mechanism permit starting the engine by pushing the vehicle forward, but it also insures against the engine stalling when the centrifugal clutch is disengaged while the vehicle is still moving forward under its momentum, for under these conditions the vehicle will drive the engine through the inclined teeth 138 and 141.

This mechanism also acts as an overrunning clutch to permit the vehicle to be pushed backward freely without rotating the engine, which is often of advantage in maneuvering in close quarters. When the vehicle is moved backwardly the inclined teeth 138 will be rotated in a counter-clockwise direction as viewed from the right in Fig. 4 and the radial faces of the teeth 138 and 141 will engage, causing the member 140 to be rotated in a counterclockwise direction also. The frictional force between the friction face 143 and the housing 103, being the result of only the axial force of the marcel spring 144, is insufficient to transmit any considerable amount of torque, so for all practical purposes the engine is left free to idle or remain stationary while the vehicle is moved backward.

Following starting of the engine as described above, the unit 45 is adapted through a centrifugal clutch action to automatically connect the engine to the pulley 110—111 to drive the vehicle when the speed of the engine exceeds a certain predetermined value. When the crankshaft 44 of the engine is rotating, the hub 102, the housing 103, the ramp 125, and the floating plate 127 rotate as a unit. When the speed of rotation is low, as in idling of the engine, the parts occupy positions as shown in Fig. 2. The extended annular coil spring 130 is nested within the ramp 125 and rotates with the ramp. In the position shown in Fig. 2, the spring 130 exerts no axial force on either the floating plate 127 or the ramp 125, permitting the plate 132 to remain stationary while the other clutch elements rotate about it. The spring tension and total weight of the grommet spring are so balanced that, in the normal idling range of the engine, it will remain in the retracted position shown in Fig. 2, but upon increase of engine speed appreciably above the idling range centrifugal force acting upon the grommet spring will expand it radially to a greater circumferential length. As the grommet spring moves outward it is forced in the direction of the floating plate 127 by the frusto-conical surface of the ramp 125, and moves the floating plate 127 into contact with the friction face 133. Continued expansion of the grommet spring 130 causes the plate 132 to be moved until the friction face 134 contacts the housing 103, when the plate 132 will tend to be driven by frictional contact with a moving surface on either side. The clutch in the engaged position is shown in Fig. 1.

Gentle engagement of the clutch, with slippage, thus begins at some predetermined speed above the normal idling range, and increase of engine speed above this value increases the axial force due to the centrifugal expansion of the grommet spring 130, this in turn increasing the clutch torque until a point is soon reached at which no further slippage between the friction faces 133, 134, and the rotating surfaces 103, 127 in contact therewith will occur even under full throttle torque of the engine. Rotation of the plate 132 during engagement of the clutch is, by reason of the engagement of the teeth 135 and 136, accompanied by rotation of the member 137 and the pulley face 110 connected therewith.

It will be evident that torque is transmitted through the pulley hub 108, housing 117 and torque link springs 115 to also rotate the pulley face 111. As the clutch is engaged, then, the vehicle moves forward and the clutch remains engaged until, due to the closing of the throttle or increase in resistance to motion of the vehicle, the engine speed drops below the speed at which the clutch initially locked in. When the speed drops below this value, the clutch again slips.

If the engine is slowed down due to increased resistance to motion of the vehicle, as in climbing a hill or pulling a heavy load, the clutch will slip under full engine torque, transmitting this torque to the rest of the transmission and holding the engine speed down to a speed slightly below the one at which locking in of the clutch normally occurs. If the increase in resistance to travel be sufficient to completely stop the vehicle, the clutch will continue to slip under full engine torque, but it will be impossible to stall the engine. If, however, the engine speed be intentionally reduced by closing the throttle, the clutch will disengage as the engine speed drops back through the engaging range into the normal idling range and the engine will then idle freely. The engine speed at which the clutch starts to engage as well as that at which it finally "locks in" for any particular engine torque may be readily predetermined by proper balance of the weight of the grommet spring 130, the initial tension of the spring, and the shape of the ramp 125. Individual or combined variation of these factors permits predetermination of engaging and locking-in speeds over an almost unlimited range.

The automatic clutch unit 45 drives the countershaft unit 46 through the V-belt 47, the two units 45 and 46 comprising an automatic transmission adapted to vary the effective transmission ratio as the vehicle speed changes, the ratio of engine speed to wheel speed being high for low speeds of the vehicle and being decreased as the vehicle speed increases. The countershaft unit 46 is mounted on the countershaft 48 which is supported in the bearings 50 retained in the wheel housing 40, and is restrained against motion along its own axis by a nut 150 bearing against the sprocket 51 at one end of the wheel housing and by a snap ring 151 and a shroud 152 cooperating with a groove in the countershaft at the other end of the wheel housing. On the end of the countershaft 48 is mounted a pulley face and housing member 153, a disc 154, a hub 155, and a sleeve 156, all welded into one unit. The hub 155 is fitted to the countershaft 48 and is rotatively connected thereto by a key 157 which is positioned in a diametric slot in the countershaft 48 and engages diametrically opposed key-ways 158 in the hub 155. A snap ring 160 cooperating with a groove in the countershaft 48 restrains the hub 155 from outward axial movement. For the purpose of compensating for belt wear, as hereinafter described, a washer 149 is positioned surrounding the shaft 48 and is limited in its rightward travel by abutment against the end of the key 157. The rightward travel of the key 157 in turn is determined by the adjustment of a screw 159 in threaded engagement with the shaft 48 and bearing against the key 157.

An axially movable inclined pulley face 161 is opposed to the pulley face 153 so as to cooperate therewith in providing inclined contact surfaces for the belt 47, and is piloted on the sleeve 156 by the inner tubular portion of an annular ramp 162 which is attached to the pulley face 161 by bending over the end portion 163 thereof. A cylindrical cage 164 is piloted on the countershaft 48 adjacent the snap ring 151 and comprises a series of circumferentially spaced fingers 165 extending through circumferentially spaced apertures 166 in the pulley face 161 and apertures 167 in the pulley face 153. The inwardly bent ends of fingers 165 are projected over a snap ring 168 surrounding the cylindrical housing portion of the pulley face 153, and are clamped, so as to attach the cage 164 to the pulley face 153, by a closed clamping ring 170 which is sprung over and seated in the outwardly turned ends of fingers 165. Between the fingers 165 the interrupted cylindrical edge of the cage 164 is bent inwardly with a V-shape at suitable angles to provide a series of aligned pairs of fulcrum edges 171. U-shaped shoes 172 of suitable abrasion-resistant metal are slipped over the fulcrum edges 171. Pivoted about the fulcrum edges 171 are a plurality of equalizer arms 173, preferably three in number and equally spaced around the cage 164, which are grooved at 174 to provide bearing grooves for the fulcrum edges, and apertured at 175 to permit a finger 165 of the cage to pass through. The curved outermost ends of these arms engage the back side of the pulley face 161 and are restrained against circumferential and axial movement relative to the pulley face by fingers 176 and 177 which form a part of the pulley face and which are bent over the sides of the equalizer arms 173 to permit free radial movement of the ends of the arms along the pulley face. Shoes 178 of abrasion-resistant sheet metal are retained by the fingers 176 and 177 and interposed between the ends of the equalizer arms and the back of the pulley face 161 to permit relative sliding motion of these parts without lubrication. The innermost ends of the equalizer arms 173 bear against the frusto-conical end of a member 180 which is slidably mounted on the countershaft 48. Hardened steel rings 181 are pressed into the member 180 to provide bearing surfaces in contact with the countershaft. The member 180 is urged in the direction of the equalizer arms 173 by resilient means, preferably comprising two compression springs 182 and 183 of different pitch diameters positioned in the space surrounding the cylindrical portion of member 180 and within the sleeve 156, and bearing at one end against the member 180 and at the other end against a washer 184 which abuts diametrically opposed adjusting screws 185 and 186 threaded through the hub 155. By means of the adjusting screws 185 and 186 the compression of the springs 182 and 183 may be changed.

It is evident that the force of the springs 182 and 183 acting through the member 180 against the inner ends of the equalizer arms 173 keeps these arms in firm engagement with the fulcrum edges 171 at all times and results in the outer ends of the arms 173 exerting a force on the pulley face 161 tending to move it toward the opposed face 153. Since all three arms 173 are acted upon equally, force is evenly applied to the pulley face 161 and the entire pulley face is moved evenly in an axial direction. The force against the fulcrum edges 171 holds the cage 164 against the shroud 152 and the snap ring 151, so that the cage is fixed in position relative to the pulley face 153. The reaction of the springs 182 and 183 against the washer 184 and the screws 185 and 186 holds the hub 155 firmly in place against the snap ring 160.

Within the housing portion of the pulley face member 153 is situated an annular ramp 187 which is loosely piloted at its central hole on the sleeve 156 and more snugly piloted at its periphery by the shoulder 188 of the pulley face member 153. Between the ramp 187 and the pulley face 153 a marcel spring 190 is compressed so that it has a slight tendency to move the ramp 187 toward the opposed ramp 162. Confined between the opposed ramps 162 and 187 is a plurality of steel balls 191 which engage the ramps 162 and 187 on either side. The ramps 162 and 187 are so shaped that the axial separation therebetween diminishes with increasing distance from the countershaft 48, and so that they never open far enough apart to permit the balls 191 to pass out of confinement between the ramps. The tendency of the springs 182 and 183 is to cause the pulley face 161 to approach the pulley face 153, thus bringing the ramps 162 and 187 nearer together and reducing the diameter of the circle of balls 191. The balls 191 are preferably of such diameter and in such number that when the unit 46 is not in rotation the balls lie in an annular ring closely around the sleeve 156 with each ball lightly pressed against the adjacent balls by the tendency of the two ramps to approach one another. Rotation of the unit 46 causes the balls 191 to fly outwardly against the ramps 162 and 187, forcing the ramp 162, and with it the pulley face 161, away from the pulley face 153 to a point where the increased force of springs 182 and 183 is sufficient to balance the centrifugal force on the balls 191. When the countershaft 48 is rotating, then, the position of the pulley face 161 relative to pulley face 153 is determined by the centrifugal force on the balls 191 which in turn is a measure of the speed of rotation of the countershaft, or the speed of the vehicle.

The operation of the countershaft unit 46 in cooperation with the clutch and pulley unit 45 and the V-belt 47 as an automatic transmission will now be considered. If the springs 182 and 183 are substantially compressed by inward adjustment of the screws 185 and 186, they preferably exert sufficient force in their extended position to urge the pulley face 161 toward the pulley face 153 with a greater force than that with which the pulley face 111 is urged toward the pulley face 110 by the springs 122 and 123 when in their compressed position. Therefore, when the vehicle is in slow motion and the units 45 and 46 are rotating, the pulley face 161 will be moved to the closest permissible position relative to the pulley face 153, being limited by abutment of the inner ends of the arms 173 with the cage 164, or by the belt 47 coming to the position of minimal pitch diameter on the unit 45. The belt 47 will be forced to near the outer periphery of the pulley faces 153 and 161, causing it at the same time to move inwardly between the pulley faces 110 and 111 of unit 45 to occupy a position close to the pulley hub 108, and forcing the pulley face 111 away from the pulley face 110 against the force of the springs 122 and 123. Under these circumstances the transmission is in "low gear"; that is, it is in a condition wherein it provides the greatest ratio between engine speed and countershaft speed, or between engine speed and wheel speed.

If the throttle of engine 41 be opened and the vehicle started forward by engagement of the clutch in the manner previously described, the vehicle will move forward in this low gear position. As the wheel speed increases, increase in rotational velocity of the countershaft 48 will subject the balls 191 to centrifugal force which will cause them to move outward against the confining ramps 162 and 187 and move the pulley face 161 away from the pulley face 153 against the force of the springs 182 and 183, as previously described. This will permit the belt 47 to move to a lower pitch diameter on the unit 46, to which position it will be forced by reason of the belt moving to a larger pitch diameter on the clutch and pulley unit 45 through action of the springs 122 and 123 in urging the pulley face 111 toward the pulley face 110. In this condition the parts may occupy positions as illustrated in Fig. 1, in which the ratio of engine speed to wheel speed has been reduced from that corresponding to the low gear condition.

Still further increase in wheel speed will result in further increase in centrifugal force on the balls 191, with resultant increase of the axial force tending to separate the pulley faces of the countershaft unit 46. This permits the belt 47 to be brought to a smaller pitch diameter on the unit 46 and to a larger pitch diameter on the unit 45, thus still further reducing the effective transmission ratio. When the wheel speed becomes sufficiently great, the pulley face 161 will be displaced to the position of greatest permissible separation in which the member 180 abuts the washer 149 and the belt 47 lies adjacent the fingers 165 on unit 46 and close to the periphery of pulley faces 110 and 111 of unit 45, the transmission then being in the condition providing the smallest permissible ratio of engine speed to wheel speed, that is, in "high gear" condition.

It is evident that when the vehicle slows down, relative motion of the various parts will occur in the reverse direction and, when the vehicle comes to a standstill, the belt 47 will again be in the position of greatest permissible pitch diameter on the countershaft unit and the balls 191 will again be retracted to their smallest pitch circle. It will also be apparent that the speed at which the centrifugal force on the balls 191 first overcomes the resultant spring force and produces shifting of the speed ratio of the transmission and the speed at which the transmission finally reaches the "high gear" condition may be adjusted by moving the screws 185 and 186 inwardly to increase the initial load upon the springs 182 and 183, or outwardly to reduce this initial tension. The transmission may thus be adjusted as desired to various road, load, and driving conditions, and by proper proportioning of the parts, almost any type of variation of the effective transmission ratio as a function of vehicle speed may be obtained.

While the foregoing description of the operation of the transmission explains the manner in which it changes the transmission ratio in response to vehicle speed, the transmission is preferably also adapted to vary the transmission ratio as the engine torque changes, in such manner as to render the overall performance of the transmission much more suitable for propulsion of motor vehicles than if ratio change were determined solely by vehicle speed. The variation of transmission ratio with engine torque is principally a result of the positions assumed by the belt 47 relative to the pulleys of the units 45 and 46 when torque is being transmitted.

Figure 5:
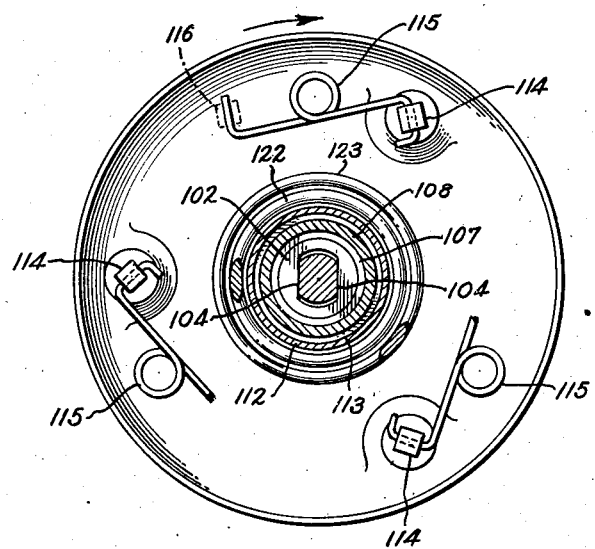
Fig. 5 is a sectional view of the clutch mechanism taken along the line 5—5 of Fig. 1 in the direction indicated by the arrows.
Figure 6:
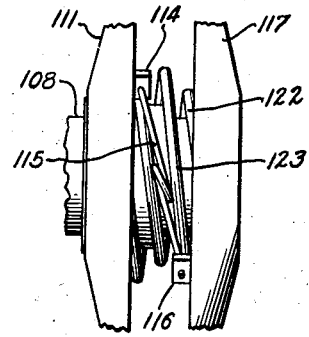
Fig. 6 is a partial plan view of the clutch shown in Fig. 1, looking in the direction indicated by the arrow 6.

In the embodiment of my invention illustrated herein, a further control element has been introduced in the construction to accentuate the creeping tendency of the belt under certain conditions of operation and to reduce it under certain other conditions, thus further improving vehicle performance. Reference to Figs. 1, 5, and 6 will show that the torque link springs 115 of the unit 45 are normally installed so that they are under compression when driving torque, applied to the housing 117 by the pulley hub 108, is transmitted through the posts 116 into the springs 115. It will be clear that when the springs 115 are angularly disposed relative to the plane of rotation of the unit, the compressive force in the springs 115 under forward driving torque will have an axial component tending to move the pulley face 111 in an axial direction.

In Fig. 9 is shown an alternative form of the clutch portion of the unit 45 in which the inclined tooth mechanism for starting is eliminated and the clutch is engaged for starting by the inward movement of the grommet spring, which results when the unit comes to rest. In this form of the unit 45, a ramp 240 is attached to the housing 103 at 126, as in the form of the apparatus previously described, and has substantially the same shape in its outward portion as the ramp 125 in the form of the unit shown in Fig. 1. The inner portion of the ramp 240, however, preferably extends inwardly substantially parallel to the plane of rotation nearly to the member 137. A floating plate 241, similar in its outer portion to the floating plate 127 of the previously described unit, is connected for rotation with the ramp 240 by the ears 128 projecting through holes in the ramp 240. The inner portion of the floating plate 241 is formed into a frusto-conical shape directed toward the opposing ramp 240. The grommet spring 130 is similar to the spring described in connection with the unit of Fig. 1 except that it is made with a fewer number of turns in the outer spring to permit it to retract into a circle of smaller diameter.

With the construction shown in Fig. 9, it is evident that when the mechanism comes to rest, as is the case when the engine stops, the grommet spring 130 will retract inwardly and by engagement with the ramp 240 on one side and the floating plate 241 on the other side, will force the floating plate 241 leftward, resulting in engagement of the floating plate 241 with the friction surface 133, and engagement of the friction surface 134 with the housing 103. In this condition the engine 41 is connected through the clutch to the pulley of the unit 45 and if the vehicle is moved forward, the engine will be rotated and will start. When the engine starts, the resultant increase in speed will cause the grommet spring 130 to expand under the influence of centrifugal force until it occupies the position shown in Fig. 9. In this position the clutch is disengaged and the engine may idle freely. Further increase in engine speed will result in normal engagement for driving the vehicle in the manner set forth previously in connection with the apparatus of Fig. 1. Normal engagement and disengagement of the clutch under variations of vehicle speed, load, and throttle opening, will automatically occur in the manner previously described. When the engine stops, either through intentional closing of the throttle or turning off of the ignition by the operator, or accidentally through operation of extraneous factors, the reduction in rotational speed of the clutch assembly permits the grommet spring 130 to retract to such a point that re-engagement of the clutch for starting is established.

While not essential for the functioning of the mechanism, it is desirable to provide a spring 242 for the purpose of centralizing the grommet spring 130 when in the idling position so that it cannot rotate eccentrically or out of balance, and thus prevent possible partial or intermittent and erratic clutch engagement. This spring 242 may take the form of a marcel spring bearing on the ramp 240 and threaded through various of the ears 128. This spring then urges the floating plate 241 rightward in such manner as to always maintain contact between the grommet spring 130 and the ramp 240 at one side, and the floating plate 241 at the other side.

In the alternative form of the unit 45 shown in Fig. 10, a flat floating plate 245 parallel to the plane of rotation is employed on one side of the grommet spring 130 and a ramp 246 is positioned on the other side of the grommet spring and is so shaped as to approach the plate 245 on either side of an intermediate diameter. A coil spring 247 bearing at one end on the housing 103 and at the other end on the floating plate 245 assures contact of the grommet spring 130 with both the floating plate 245 and the ramp 246 at all times. In this form of the unit a single member 248 takes the place of the disc 132 and the member 137, being connected at its outer end with the friction faces 133 and 134, and at its inner end to the pulley face 110 by means of the lugs 139. This construction eliminates the coupling teeth 135 and 136 of the previously described construction, but is accompanied by the disadvantage that as the member 248 moves during engagement and disengagement of the clutch, the pulley face 110 is also required to move. To permit the limited movement required of this pulley face, the hub 102 is reduced at 250 to permit movement of the bushing 107 upon it.

The operation of the unit illustrated in Fig. 10 is similar to that of the previously described unit shown in Fig. 9. The parts are shown in the position which they would take during idling of the engine. When the engine stops, the grommet spring 130 retracts inwardly and the curved inner portion of the ramp 246 introduces an increased component of axial engaging force which is exerted against the floating plate 245, and in this manner the clutch is engaged preparatory to restarting the engine by motion of the vehicle in a forward direction. As the engine speeds up from the idling condition, the grommet spring 130 is thrown outward and the clutch is engaged for moving the vehicle forward as previously described.

In Fig. 11 is illustrated an alternative form of the clutch portion of the unit 45 in which two grommet springs are employed to perform separately the functions of clutch engagement for engine starting and clutch engagement for movement of the vehicle. A ramp 251 is provided of the same general character as the ramp 125 in the unit illustrated in Fig. 1 and is attached to the housing 103 in a similar manner. The ramp 251 has an arcuate inner portion within which is nested the grommet spring 252. Preferably welded to the inner edge of the ramp 251 is another ramp 253 which approaches the floating plate 245 as it proceeds inwardly and has an arcuate outer portion within which is adapted to be nested a grommet spring 254. Except for the fact that no retracting spring for the floating plate 245 is required, the construction of the remainder of the unit is similar to that previously described in connection with Fig. 10. The parts of the mechanism are shown in the positions which they take when the engine is idling. The grommet spring 252 cooperates with the ramp 251 and the floating plate 245 to effect clutch engagement at speeds of the engine greater than idling speed in the same manner as has previously been described in connection with the apparatus of Fig. 1. When the engine stops, the grommet spring 254 retracts inwardly to a smaller diameter and by reason of engagement with the ramp 253 forces the floating plate 245 to the left, causing the clutch to engage, whereupon the engine may again be started by forward motion of the vehicle. When the engine starts, the grommet spring 254 will be thrown outward into the position shown in Fig. 11, resulting in disengagement of the clutch to permit free idling of the engine. Employment of two springs 252 and 253, instead of one, makes it easier to proportion the parts of the mechanism with minimal mechanical compromise.

While I have described my clutch apparatus in connection with a three-wheeled vehicle, it will be understood that the same transmission may be employed in the propulsion of a two-wheeled vehicle, which, for example, may be of the general type disclosed in the patent application of Howard B. Lewis, Bruce Burns, Austin E. Elmore, and Esley F. Salsbury, Serial No. 202,868, now U. S. Patent No. 2,225,914, issued Dec. 24, 1940 or in any other suitable form of vehicle. It will also be understood that various variations or modifications in design or construction of the parts of the apparatus of my invention other than those disclosed herein may be made by those skilled in the art without departing from the spirit and scope of the appended claims.

It will be seen that my invention involves the use of two clutches one of which may be called the starting clutch which operates by the friction of the frictional material 143. The other may be termed the running clutch and operates by the friction of the friction faces 133. The mechanism is so designed that the inclined teeth 141 tend to throw the starting clutch into action and cause the starting clutch to start the motor whenever the vehicle is pushed forward with the motor at rest. As soon as the motor exceeds the speed at which it would be driven by the vehicle the starting clutch releases.

To render the starting clutch effective, it is necessary that the running clutch be entirely inoperative whenever the motor is rotating below a definite critical speed. This is accomplished by the centrifugal means in the running clutch which renders this clutch operative only when the motor is rotating above this critical speed. In practice with both the motor and vehicle at rest the vehicle is given a short push forward which causes the starting clutch to engage and start the motor which immediately accelerates to idling speed which is slower than the critical speed necessary to cause the running clutch to engage. During this acceleration the starting clutch disengages as soon as the motor exerts any force tending to drive the vehicle. The motor then rotates at idling speed without driving the vehicle until the operator by opening the throttle accelerates it to the critical speed when the running clutch is automatically thrown into engagement.

This application is a division of my application Serial No. 253,557, filed January 30, 1939.

I claim as my invention:

1. In power transmission apparatus associated with a prime mover, and a shaft rotated by said prime mover, the combination of: a member mounted to rotate about the axis of said shaft; a second member connected for rotation with said shaft and shaped to provide a ramp extending toward said first member as it proceeds outwardly from said axis; a plate positioned between said ramp and said first member, said plate being connected with said second member to rotate therewith but to permit axial movement relative thereto; and a circumferentially resilient centrifugal element disposed annularly around said shaft between said ramp and said plate, said element being adapted to move outwardly in response to centrifugal force and by engagement with said ramp to move said plate into clutch engaging contact with said member, the resilience of said centrifugal element tending to retract it inwardly in opposition to centrifugal force.

2. In power transmission apparatus associated with a prime mover, and a shaft rotated by said prime mover, the combination of: an axially movable member mounted to rotate about the axis of said shaft; means connected for rotation with said shaft and providing a surface on one side of said member for engagement therewith and a ramp on the other side of said member extending toward said member as it proceeds outwardly from said axis; and a circumferentially resilient centrifugal element disposed annularly around said shaft between said ramp and said member, said element being adapted to move outwardly in response to centrifugal force and by engagement with said ramp to move said member into clutch engaging contact with said surface, the resilience of said centrifugal element tending to retract it inwardly in opposition to centrifugal force.

3. In power transmission apparatus associated with a prime mover and a shaft rotated by said prime mover, the combination of: an axially movable member mounted to rotate about the axis of said shaft; means connected for rotation with said shaft and providing a surface on one side of said member for engagement therewith and a ramp on the other side of said member extending toward said member as it proceeds outwardly from said axis; a plate positioned between said ramp and said member, said plate being connected to rotate with said ramp but being axially movable relative thereto; a circumferentially resilient centrifugal element disposed annularly around said shaft between said ramp and said plate, said element being adapted to move outwardly in response to centrifugal force and by engagement with said ramp to move said plate into engagement with said member, and said member into engagement with said surface, the resilience of said centrifugal element tending to retract it inwardly in opposition to centrifugal force; and means limiting the inward travel of said centrifugal element.

4. In power transmission apparatus associated with a prime mover and a shaft rotated by said prime mover, the combination of: an axially movable member mounted to rotate about the axis of said shaft; means connected for rotation with said shaft and providing a surface on one side of said member for engagement therewith and a ramp on the other side of said member extending toward said member as it proceeds outwardly from said axis; a plate positioned between said ramp and said member, said plate being connected to rotate with said ramp but being axially movable relative thereto; a continuous coil spring disposed annularly in tension around said shaft between said ramp and said plate, said spring being adapted to move outwardly in response to centrifugal force and by engagement with said ramp to move said plate into engagement with said member, and said member into engagement with said surface; and means limiting the inward travel of said spring.

5. In power transmission apparatus associated with a prime mover and a shaft rotated by said prime mover, the combination of: an axially movable member mounted to rotate about the axis of said shaft; means connected for rotation with said shaft and providing a surface on one side of said member for engagement therewith and a ramp on the other side of said member extending toward said member as it proceeds outwardly from said axis; a plate positioned between said ramp and said member, said plate being connected to rotate with said ramp and being axially movable relative thereto; an extended annular coil spring disposed between said ramp and said plate, said spring being adapted to move outwardly in response to centrifugal force and by engagement with said ramp to move said plate into engagement with said member, and said member into engagement with said surface; a filler element disposed annularly within said spring, providing increased mass thereto; and means limiting the inward travel of said spring.

6. In power transmission apparatus associated with a prime mover and a shaft rotated by said prime mover, the combination of: an axially movable member mounted to rotate about the axis of said shaft; means connected for rotation with said shaft and providing a surface on one side of said member for engagement therewith and a ramp on the other side of said member; a plate positioned between said ramp and said member, said plate being connected to rotate with said ramp and being axially movable relative thereto, said ramp and said plate being so shaped that the axial separation therebetween is greatest at a certain radius, and decreases with increasing or decreasing radius from said certain radius; and an extended annular coil spring disposed between said ramp and said plate.

BRUCE BURNS.